United States Patent
Tsuchiya et al.

(10) Patent No.: US 12,403,818 B2
(45) Date of Patent: Sep. 2, 2025

(54) ILLUMINATION DEVICE FOR VEHICLE

(71) Applicant: HONDA MOTOR CO., LTD., Tokyo (JP)

(72) Inventors: Yuji Tsuchiya, Wako (JP); Masayoshi Takori, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 18/585,123

(22) Filed: Feb. 23, 2024

(65) Prior Publication Data

US 2024/0308419 A1    Sep. 19, 2024

(30) Foreign Application Priority Data

Mar. 17, 2023   (JP) ................ 2023-043181

(51) Int. Cl.
*B60Q 1/30*   (2006.01)
*G06F 3/01*   (2006.01)

(52) U.S. Cl.
CPC .............. *B60Q 1/30* (2013.01); *G06F 3/013* (2013.01)

(58) Field of Classification Search
CPC ................. B60Q 1/30; G06F 3/013
USPC ....................................... 340/479
See application file for complete search history.

(56) References Cited

U.S. PATENT DOCUMENTS

| | | | | |
|---|---|---|---|---|
| 6,124,647 A | * | 9/2000 | Marcus | B60K 35/654 362/494 |
| 6,133,851 A | * | 10/2000 | Johnson | B60Q 1/535 340/901 |
| 2008/0211655 A1 | * | 9/2008 | Trefren | B60Q 1/549 340/468 |
| 2017/0210285 A1 | * | 7/2017 | Kobayashi | B60Q 1/507 |
| 2019/0204827 A1 | * | 7/2019 | Bhalla | G05D 1/0061 |

FOREIGN PATENT DOCUMENTS

JP           07-232590        9/1995

* cited by examiner

*Primary Examiner* — Kerri L McNally
(74) *Attorney, Agent, or Firm* — Amin, Turocy & Watson, LLP (57) ABSTRACT

In an illumination device for a vehicle, when a recognition part recognizes that a following vehicle is present behind a vehicle and on one side of either left or right side in a vehicle width direction, and when a detection part detects that a driver recognizes the following vehicle, an exterior light is made to either first lit or first not-lit state. When the recognition part recognizes that the following vehicle is present behind the vehicle and on one side of either the left or right side in the vehicle width direction, and when the detection part detects that the driver does not recognize the following vehicle, the exterior light is made to either second lit or second not-lit state. The first lighting state and the second lighting state are different from each other, and the first not-lit state and the second not-lit state are different from each other.

4 Claims, 9 Drawing Sheets

ILLUMINATION DEVICE FOR VEHICLE

CROSS-REFERENCE TO RELATED APPLICATION

Priority is claimed on Japanese Patent Application No. 2023-043181, filed Mar. 17, 2023, the content of which is incorporated herein by reference.

BACKGROUND OF THE INVENTION

Field of the Invention

The present invention relates to an illumination device for a vehicle.

Description of Related Art

As a means configured to express intentions of a host vehicle to a following vehicle, there is a brake lamp or a direction indicator. However, it is difficult to accurately express intentions to the following vehicle using only such a means, and various techniques have been proposed.

For example, a technology has been proposed that adds a message function to a tail lamp (for example, see Japanese Unexamined Patent Application, First Publication No. H07-232590). This is an attempt to avoid ambiguity in expressing intentions to a following vehicle.

SUMMARY OF THE INVENTION

However, in the related art described above, whether or not a driver of a vehicle recognizes the following vehicle cannot be clearly understood from the following vehicle. This could be a cause for concern for the following vehicle, and there is room for improvement to ensure traffic safety.

An aspect of the present invention is directed to providing an illumination device for a vehicle capable of providing a sense of security for the following vehicle, further improving traffic safety and contributing to development of a sustainable transportation system.

(1) An illumination device for a vehicle (for example, an illumination device for a vehicle (1) of an embodiment) according to the present invention includes a recognition part (for example, a recognition part (2) of the embodiment) configured to recognize that a following vehicle (for example, a following vehicle (102) of the embodiment) present behind a vehicle (for example, a vehicle (100) of the embodiment) is present on either a left or right side in a vehicle width direction; a detection part (for example, a detection part (3) of the embodiment) configured to detect that a driver of the vehicle has recognized the following vehicle; and a pair of left and right exterior lights (for example, exterior lights (5) and tail lamps (6) of the embodiment) provided at least at one of a rear position and side positions in a vehicle width direction among an exterior region of the vehicle, when the recognition part recognizes that the following vehicle is present on the one side and when the detection part detects that the driver recognizes the following vehicle, the exterior light of the pair of left and right exterior lights which is disposed on a side, to which the following vehicle has moved, is made to either a first lit or first not-lit state, when the recognition part recognizes that a following vehicle is present on the one side and when the detection part detects that the driver has not recognized the following vehicle, the exterior light of the pair of left and right exterior lights which is disposed on the side, to which the following vehicle has moved, is made to either a second lit or second not-lit state, and the first lighting state and the second lighting state are different from each other and the first not-lit state and the second not-lit state are different from each other.

According to the above-mentioned configuration, the following vehicle can clearly understand whether the driver recognizes the following vehicle. For this reason, it is possible to provide an illumination device for a vehicle capable of providing a sense of security for the following vehicle, further improving traffic safety and contributing to development of a sustainable transportation system.

(2) In the above-mentioned configuration, the second lighting state and the second not-lit state may be changed when the vehicle turns to the one side.

According to the above-mentioned configuration, the following vehicle can more accurately understand the vehicle's behavior in advance. For this reason, it is possible to provide an illumination device for a vehicle that is even safer for the following vehicle.

(3) In the above-mentioned configuration, the vehicle may include a rear display device (for example, a rear display device (7) of the embodiment) configured to display behind the vehicle, and the detection part may detect that the driver has recognized presence of the following vehicle when a line of sight of the driver is directed to the rear display device.

According to the above-mentioned configuration, the detection part can accurately detect that the driver of the vehicle has recognized the following vehicle.

(4) In the above-mentioned configuration, the detection part may detect that the driver has recognized presence of the following vehicle when a state of the driver has changed after the line of sight of the driver has been directed to the rear display device.

According to the above-mentioned configuration, the detection part can detect with even higher accuracy that the driver of the vehicle has recognized the following vehicle.

According to the aspect of the present invention, the illumination device for a vehicle can provide a sense of security for the following vehicle, further improve traffic safety and contribute to development of a sustainable transportation system.

DETAILED DESCRIPTION OF THE INVENTION

Next, an embodiment of the present invention will be described with reference to the accompanying drawings.

<Illumination Device for Vehicle>

Figure 1:
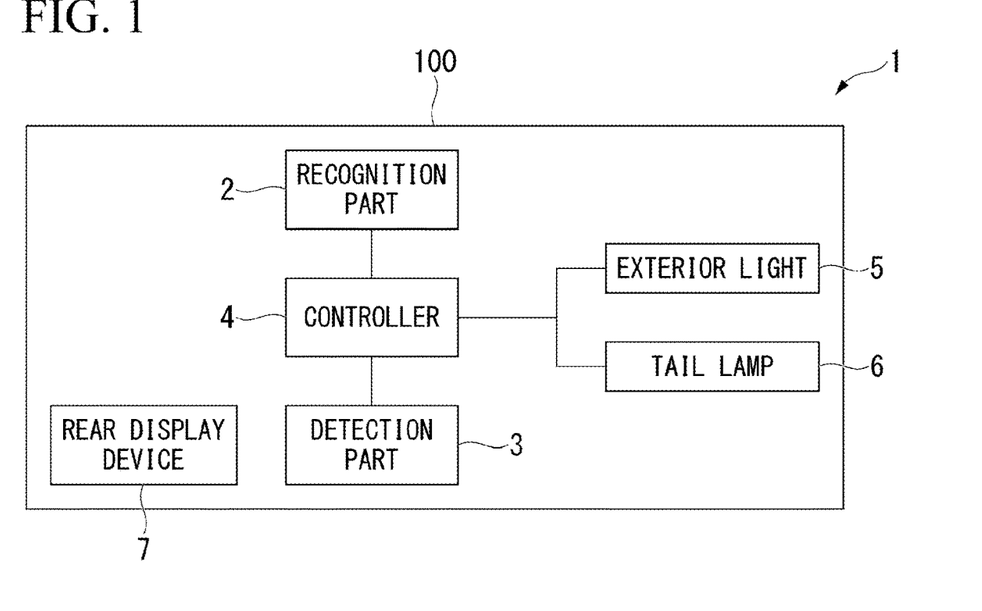
FIG. 1 is a block diagram of an illumination device for a vehicle according to an embodiment of the present invention.
Figure 2:
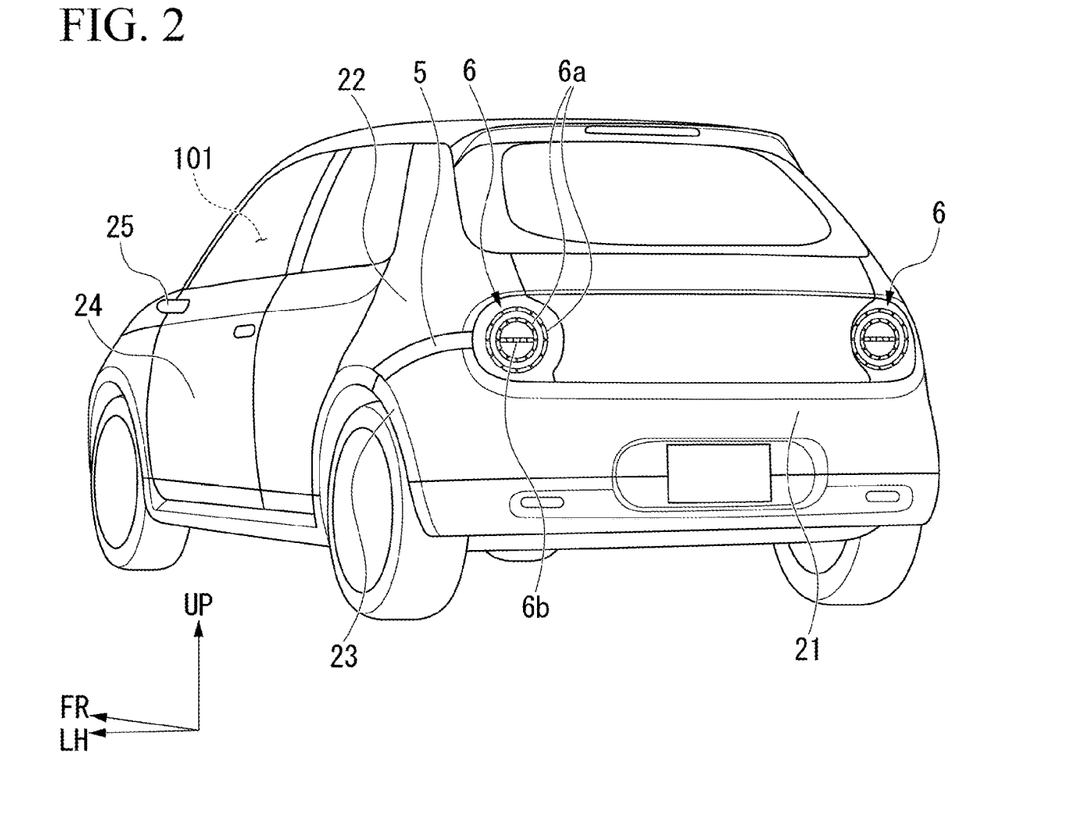
FIG. 2 is a perspective view of a vehicle according to the embodiment of the present invention.

FIG. 1 is a block diagram of an illumination device for a vehicle 1. FIG. 2 is a perspective view of a vehicle 100 on which the illumination device for a vehicle 1 is mounted. In the drawings described below, to make directions easier to understand, a side in front of the vehicle 100 is indicated by an arrow FR as necessary. A side above the vehicle 100 is indicated by an arrow UP. A left side in a state in which the vehicle 100 is directed forward is indicated by an arrow LH.

As shown in FIG. 1 and FIG. 2, the illumination device for a vehicle 1 is mounted on the vehicle 100. The illumination device for a vehicle 1 includes a recognition part 2 configured to recognize a following vehicle (see FIG. 4) 102, a detection part 3 configured to detect movement of a driver (not shown), exterior lights 5 and tail lamps 6 provided on a rear portion of the vehicle 100, a controller 4 configured to generally control the recognition part 2, the detection part 3, the exterior lights 5 and the tail lamps 6, and a rear display device 7 configured to allow visual recognition on a side behind the vehicle 100.

The recognition part 2 is, for example, a sensor constituted by a camera, radar, or the like, provided on a rear portion of the vehicle 100. The recognition part 2 recognizes a position of the following vehicle 102. Information recognized by the recognition part 2 is output to the controller 4 as a signal.

For example, a motorcycle is assumed as the following vehicle 102. However, there is no limitation thereto, and the following vehicle 102 includes vehicles that may be located on either a left or right side behind the vehicle 100 in a vehicle width direction. For example, a bicycle or the like is exemplified as the following vehicle 102.

The detection part 3 is provided in, for example, a passenger compartment 101 of the vehicle 100. The detection part 3 detects a line of sight, a pupil, diaphoresis, and a heart rate of a driver (not shown).

For example, detection of a line of sight of a driver includes a cornea reflection method configured to reflect infrared light with a driver's cornea to detect a line of sight direction of a user, a limbus tracking method of using a difference in reflectance with respect to light between the cornea and the sclera, an image analysis method of imaging a picture of an eye ball using a camera and detecting a line of sight through image processing, or the like. Information detected by the detection part 3 is output to the controller 4 as a signal.

For example, when the diaphoresis or the heart rate of the driver is detected, a sensor is provided on a handle, or a sensor that can be attached to a driver's wrist or the like is used. The diaphoresis and the heart rate of the driver are detected using these sensors.

The controller 4 performs operation control of the exterior lights 5 or the tail lamps 6 on the basis of signals input from the recognition part 2 and the detection part 3.

The exterior lights 5 are provided at positions where the following vehicle 102 can be recognized on left or right side of a rear portion in an exterior region (vehicle body surface) of the vehicle 100. Specifically, first, the exterior region of the rear portion of the vehicle 100 will be described. The exterior region of the rear portion of the vehicle 100 includes a rear panel 21 extending in a vehicle width direction, and pillars 22 and rear wheel houses 23 disposed on both sides of the rear panel 21 in the vehicle width direction. The rear pillars 22 extend in an upward/downward direction. The rear wheel houses 23 are provided below the rear pillars 22.

In the exterior region of the vehicle 100, the exterior lights 5 are disposed in a space from both ends of the rear panel 21 in the vehicle width direction to the rear wheel houses 23 via the rear pillars 22. In addition, the plurality of exterior lights 5 are disposed to be located in parallel diagonally downward as it goes forward. In other words, the plurality of exterior lights 5 are disposed in parallel in the forward/rearward direction. As operations of the exterior lights 5 are controlled by the controller 4, a lighting state is changed according to a situation (details will be described below).

The tail lamps 6 are provided on both sides of the rear panel 21 in the vehicle width direction. The tail lamps 6 include a plurality of annular lights 6a disposed in an annular shape when seen from a rear side, and a plurality of horizontal lights 6b disposed inside the annular lights 6a in the radial direction and disposed in parallel in the vehicle width direction.

The tail lamps 6 have a role of informing the following vehicle 102 of the location of the host vehicle at night or the like. In addition, the tail lamps 6 have a roll of changing a display method according to a situation as a state display light as operations of the tail lamps 6 are controlled by the controller 4 (details will be described below).

The rear display device 7 is, for example, a monitor provided in the passenger compartment 101. For example, the monitors are disposed on both left and right sides on a dashboard (not shown). For example, images captured by side cameras 25 provided on left and right doors 24 on the sides of a driver's seat and a passenger seat are displayed on the monitors. The side cameras 25 capture an image of the rear view of the vehicle 100 from the side in the vehicle width direction. That is, the rear display device 7 (monitor) has a role as door mirrors.

<Operations of Illumination Device for Vehicle>

Next, operations of the illumination device for a vehicle 1 will be described with reference to FIG. 2 to FIG. 13.

Figure 3:
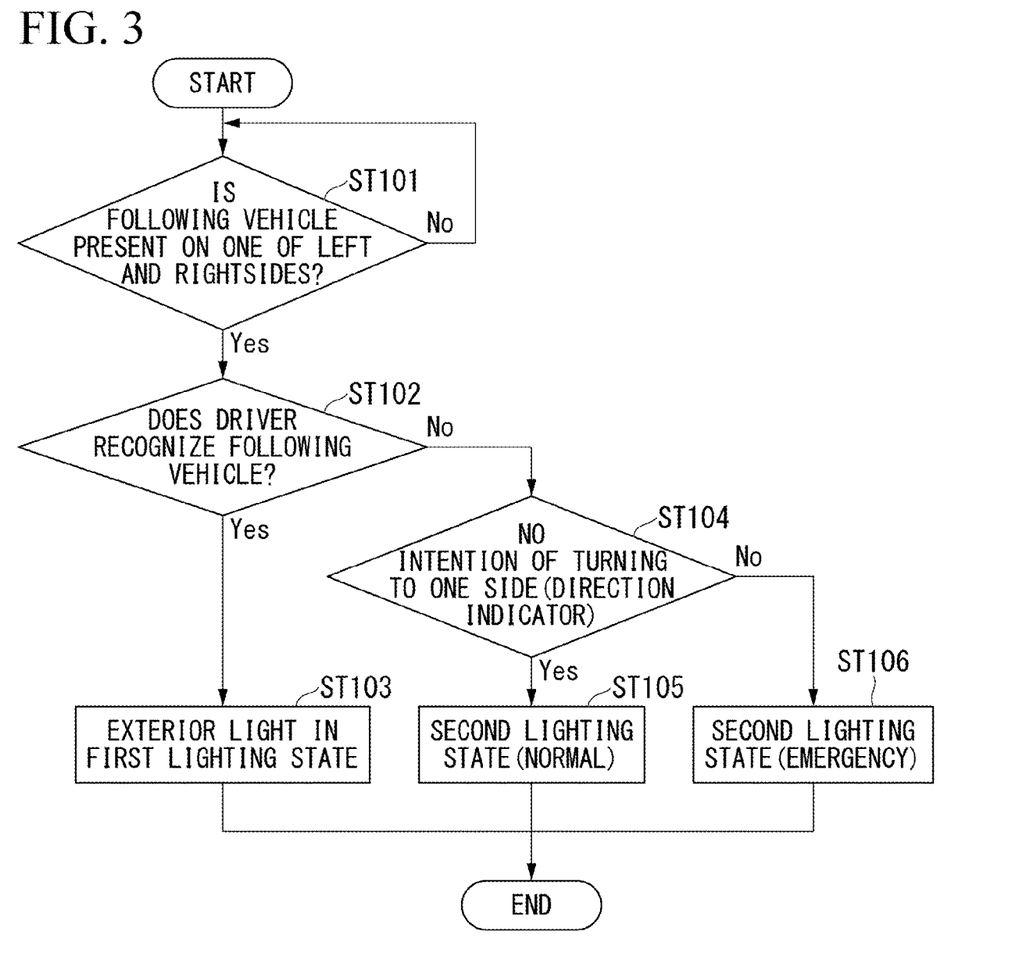
FIG. 3 is a flowchart for describing an operation control of an illumination device for a vehicle according to the embodiment of the present invention.

FIG. 3 is a flowchart for describing operation control of the illumination device for a vehicle 1.

As shown in FIG. 3, first, the recognition part 2 recognizes existence of the following vehicle 102 and a position of the following vehicle 102 when the following vehicle 102 is present. The controller 4 determines whether the following vehicle 102 recognized by the recognition part 2 is present on either a left or right side in the vehicle width direction (step ST101).

Figure 4:
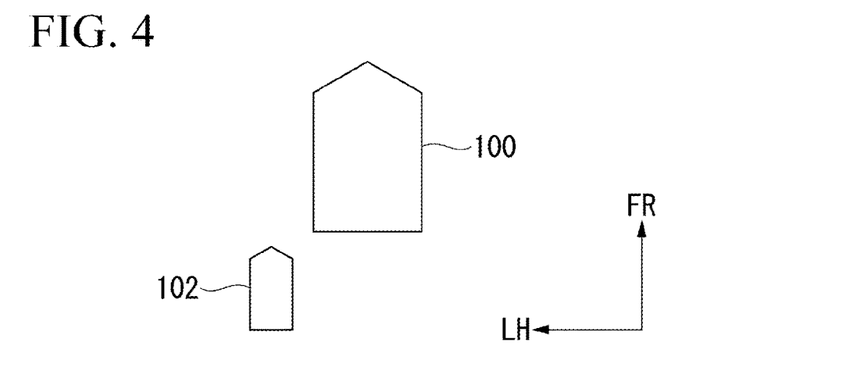
FIG. 4 is a schematic view for describing a position of a following vehicle with respect to the vehicle according to the embodiment of the present invention.

Here, a situation in which the following vehicle 102 is present on one of left and right sides of the vehicle 100 in the vehicle width direction will be described with reference to FIG. 4. FIG. 4 is a schematic view for describing a position of the following vehicle 102 with respect to the vehicle 100.

As shown in FIG. 4, for example, the position is a position captured by the side cameras 25 in a state in which the following vehicle 102 present behind the vehicle 100 is present on one of left and right sides in the vehicle width direction.

However, the following vehicle 102 may not be completely located on either the left or right side in the vehicle width direction. When the following vehicle 102 is located behind the vehicle 100 and on either the left or right side in the vehicle width direction, the controller 4 can make a determination. The recognition part 2 does not recognize the following vehicle 102 only when the following vehicle 102 is located behind the vehicle 100 and on either the left or right side in the vehicle width direction. It is not limited to such a situation, and the recognition part 2 can always recognize the position of the following vehicle 102 at the time when the following vehicle 102 is present behind the vehicle 100.

Returning to FIG. 3, when determination in step ST101 is "No," i.e., the following vehicle 102 is not present on either the left or right side in the vehicle width direction, determination in step ST101 is performed again.

When determination in step ST101 is "Yes," i.e., the following vehicle 102 is present on either the left or right side in the vehicle width direction, determination of whether a driver recognizes the following vehicle 102 is performed (step ST102).

Here, a method of determining whether a driver recognizes the following vehicle 102 will be described with reference to FIG. 5.

Figure 5:
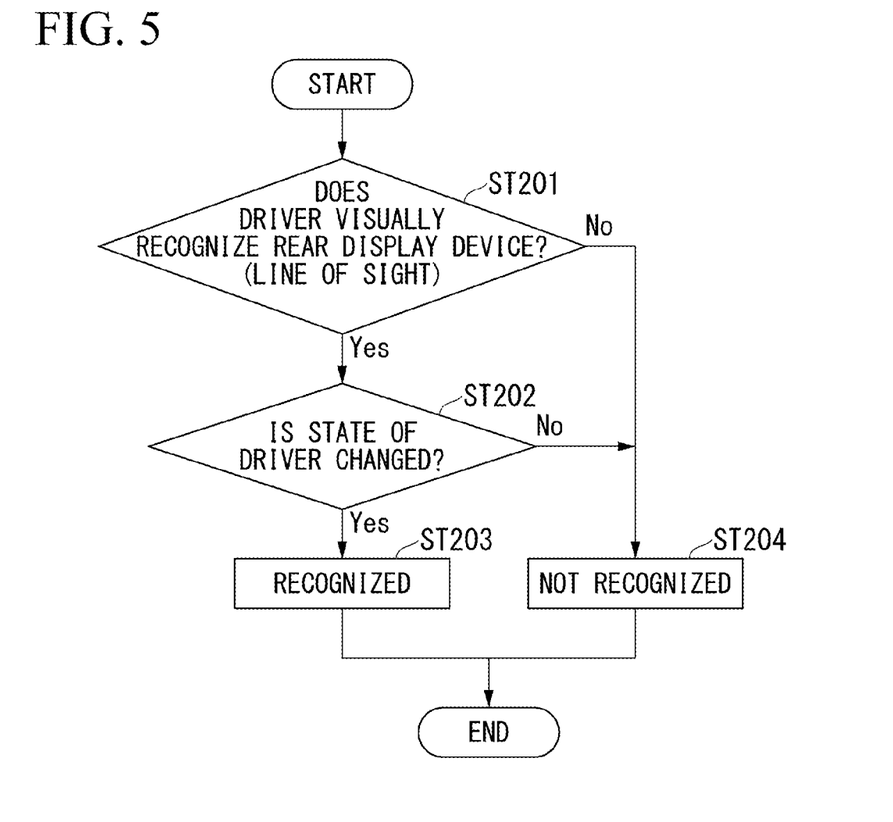
FIG. 5 is a flowchart showing a method of determining whether a driver recognizes a following vehicle according to the embodiment of the present invention.

FIG. 5 is a flowchart showing a method of determining whether a driver recognizes the following vehicle 102.

As shown in FIG. 5, in determining whether a driver recognizes the following vehicle 102, further, it is determined whether the driver visually recognizes the rear display device 7 (step ST201).

More specifically, a line of sight of the driver is detected by the detection part 3. The detection result is output to the controller 4 as a signal. Then, the controller 4 determines whether the line of sight of the driver detected by the detection part 3 is directed toward the rear display device 7 (visually recognized).

When determination in step ST201 is "Yes" and a driver visually recognizes the rear display device 7, it is determined whether a state of the driver is changed (step ST202). The change in the state of the driver is, for example, a change in the pupil, the diaphoresis, and the heart rate of the driver. That is, normally, when the driver recognizes the following vehicle 102 through the rear display device 7, a slight change occurs in the driver's pupil, diaphoresis, heart rate, etc. This change is a change in the state of the driver.

When determination in step ST202 is "Yes," i.e., the state of the driver is changed, it is determined that the driver recognizes the following vehicle 102 (step ST203).

Meanwhile, when determination in step ST201 is "No," i.e., the driver does not visually recognize the rear display device 7, and when determination in step ST202 is "No," i.e., the state of the driver is not changed, it is determined that the driver does not recognize the following vehicle 102 (step ST204). As described above, determination of whether the driver recognizes the following vehicle 102 is terminated.

Returning to FIG. 3, when determination in step ST102 is "Yes," i.e., the driver recognizes the following vehicle 102, among the left and right exterior lights 5, the exterior light 5 on one side where the following vehicle 102 is present (hereinafter, simply referred to as the side of the following vehicle 102) is set as a first lighting state (step ST103). One side where the following vehicle 102 is present is either the left or right side in the vehicle width direction in which the following vehicle 102 determined in step ST101 is present. A specific example of the first lighting state will be described in detail together with a second lighting state, which will be described below.

Meanwhile, when determination in step ST102 is "No," i.e., the driver does not recognize the following vehicle 102, it is determined whether the vehicle 100 (driver) has no intention of turning to the side where the following vehicle 102 is present (step ST104).

Determination of whether the vehicle 100 is about to turn to the side where the following vehicle 102 is present is performed by, for example, determining whether one of the pair of tail lamps 6 provided on both sides of the vehicle 100 in the vehicle width direction coinciding with the position of the following vehicle 102 is blinking or not. In addition, it may be determined whether the vehicle 100 is going to make a turn to the side where the following vehicle 102 is present by a driver's handle operation (not shown).

When determination in step ST104 is "Yes," i.e., the vehicle 100 has no intention of turning to the side where the following vehicle 102 is present, the exterior light 5 on the side of the following vehicle 102 is made in a second lighting state (step ST105).

Meanwhile, when determination in step ST104 is "No," i.e., the vehicle 100 has intention of turning to the side where the following vehicle 102 is present, the exterior light 5 on the side of the following vehicle 102 is in the second lighting state (step ST106).

Here, the second lighting state in step ST106 is different from the second lighting state in step ST105. That is, in step ST105, since the vehicle 100 is not about to turn even when the driver does not recognize the following vehicle 102, there is no need to actively warn the following vehicle 102. On the other hand, in step ST106, since the vehicle 100 is about to turn while the driver is not recognizing the following vehicle 102, it is necessary to actively warn the following vehicle 102. For this reason, the lighting state is different between the second lighting in step ST106 and the second lighting in step ST105. Hereinafter, the second lighting in step ST105 is referred to as normal second lighting. The second lighting in step ST106 is referred to as emergency second lighting.

<Example of Lighting State of Exterior Light in First Lighting and Second Lighting>

Next, an example of the lighting state of the exterior lights 5 in the first lighting and the second lighting will be described with reference to FIG. 6 to FIG. 8.

Figure 6:
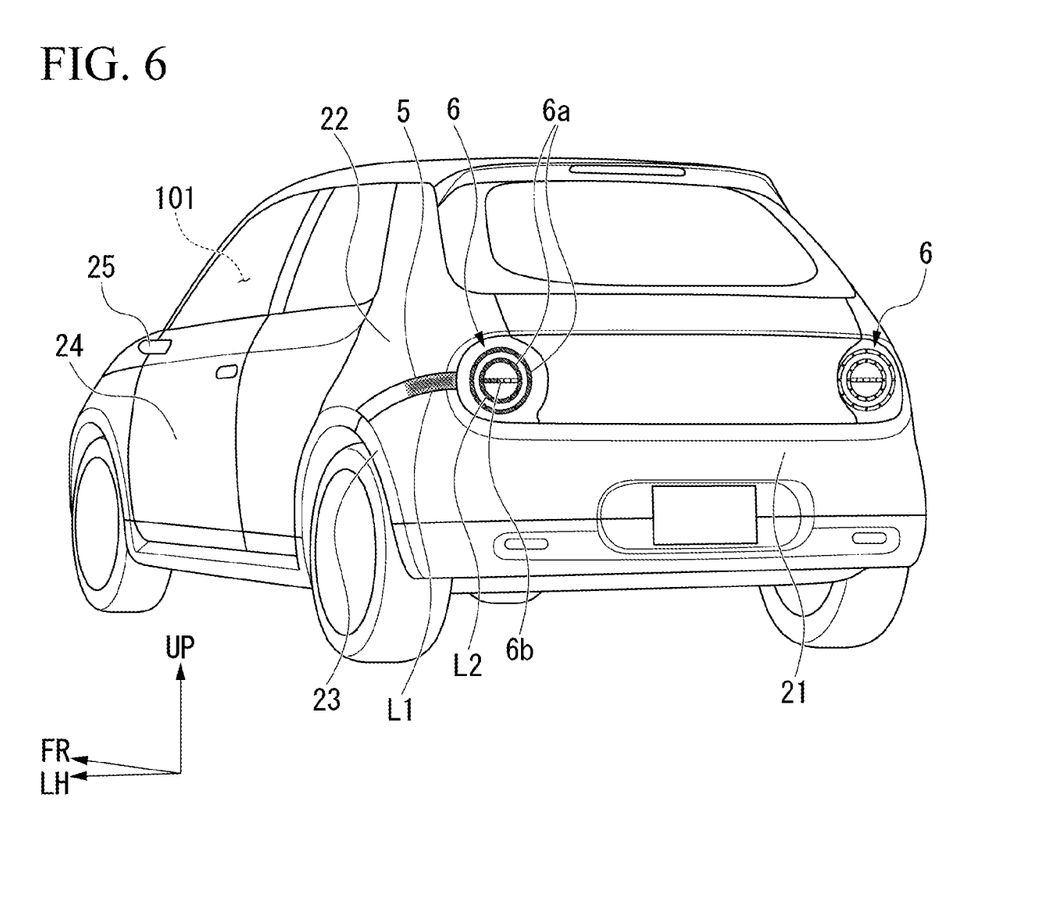
FIG. 6 is a perspective view of the vehicle showing a state of first lighting according to the embodiment of the present invention.

FIG. 6 is a perspective view of the vehicle 100 showing the lighting state of the exterior lights 5 in the first lighting. FIG. 6 corresponds to the above-mentioned FIG. 2 (the same as in FIGS. 7 and 8, which will be described below).

As shown in FIG. 6, in the first lighting, the rear exterior light 5, which is the exterior light 5 on the side of the following vehicle 102, of the plurality of exterior lights 5 arranged in parallel in the forward/rearward direction is lighted (see a lighting unit L1 in FIG. 6). In addition, a part of the tail lamp 6 on the following vehicle 102 is lighted (see a lighting unit L2 in FIG. 6). For this reason, the following vehicle 102 can see that the vehicle 100 recognizes the following vehicle 102. An example of the lighting state of the tail lamps 6 will be described below.

Figure 7:
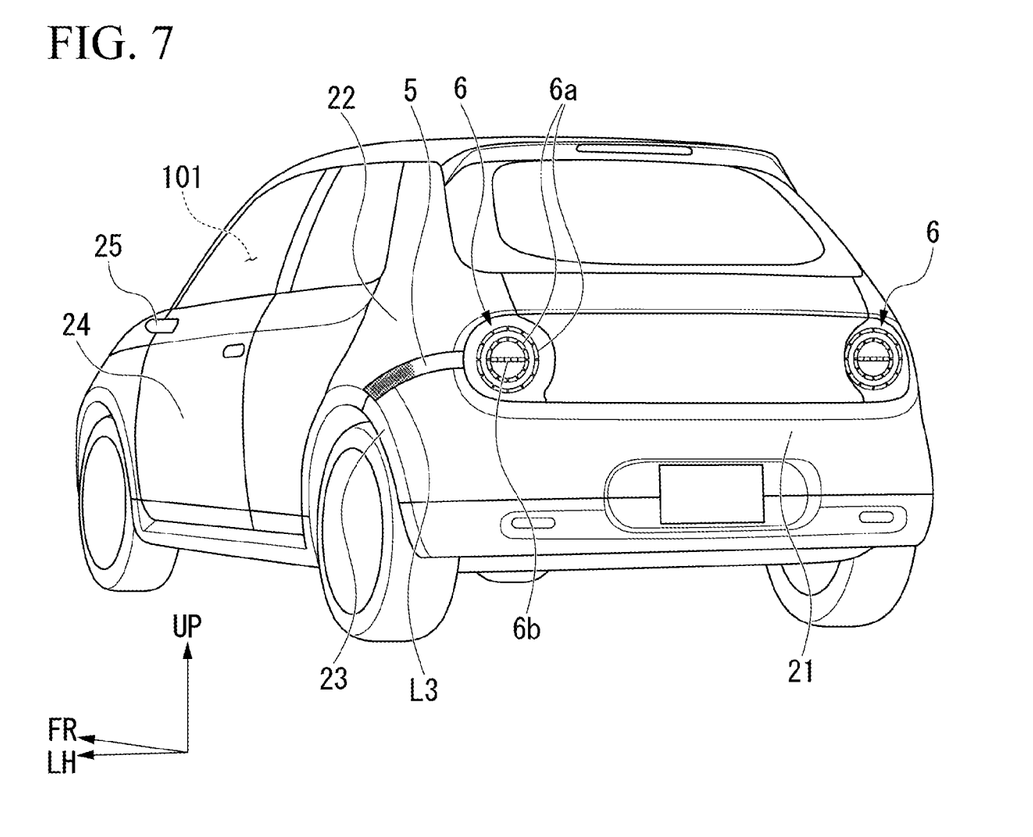
FIG. 7 is a perspective view of the vehicle showing a normal state of second lighting according to the embodiment of the present invention.

FIG. 7 is a perspective view of the vehicle 100 showing the lighting state of the exterior lights 5 in the normal second lighting.

As shown in FIG. 7, in the normal second lighting, the front exterior light 5, which is the exterior light 5 on the side of the following vehicle 102, of the plurality of exterior lights 5 arranged in parallel in the forward/rearward direction is lighted (see a lighting unit L3 in FIG. 7). That is, the following vehicle 102 is notified that the line of sight of the driver is directed forward. For this reason, the following vehicle 102 can see that the vehicle 100 does not recognize the following vehicle 102. Further, for example, the tail lamps 6 at this time are turned off.

Figure 8:
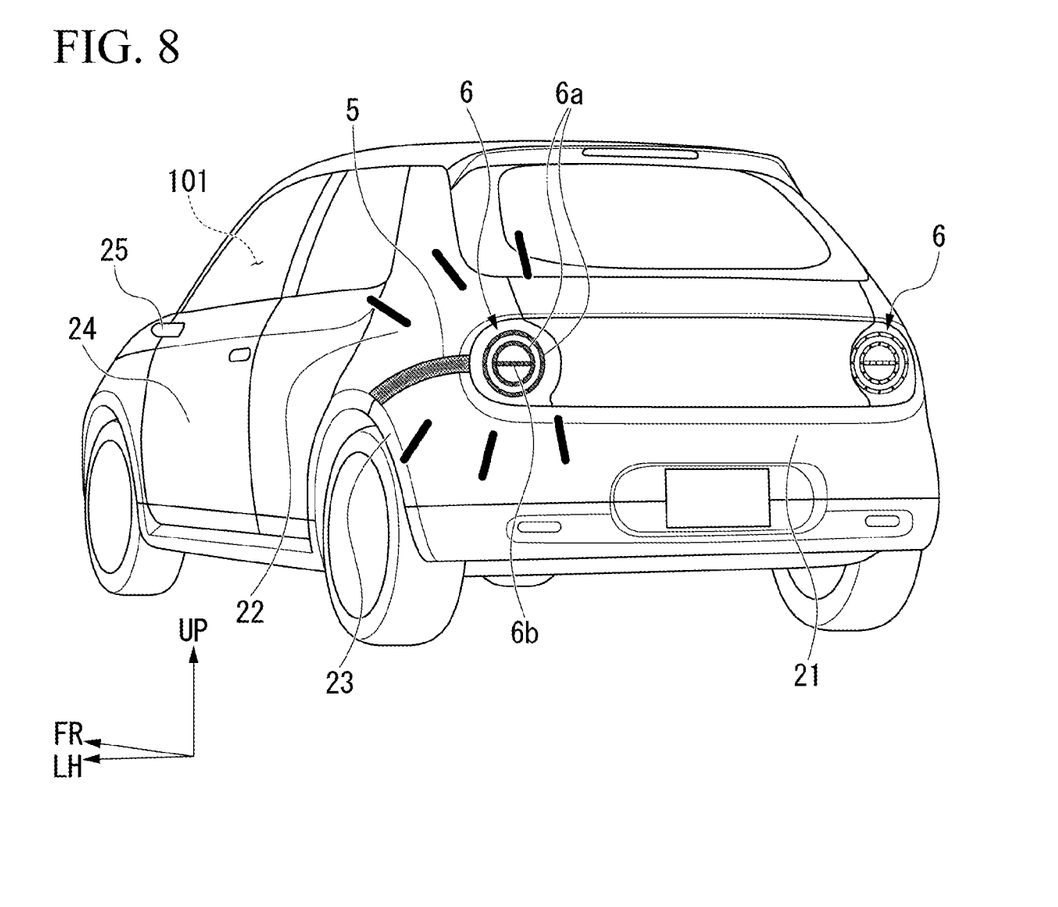
FIG. 8 is a perspective view of the vehicle showing an emergency state of second lighting according to the embodiment of the present invention.

FIG. 8 is a perspective view of the vehicle 100 showing the lighting state of the exterior lights 5 in the emergency second lighting.

As shown in FIG. 8, in the emergency second lighting, all the exterior lights 5 on the side of the following vehicle 102 are made to blink, and the tail lamps 6 on the side of the following vehicle 102 are also made to blink. Accordingly, it is possible to call attention to the following vehicle 102.

<Example of Lighting State of Tail Lamp>

As described above, while an example of the lighting state of the exterior lights 5 has been mainly described, the lighting state of the tail lamps 6 may be changed according to each situation. In the following description, in the drawings, it is assumed that areas indicated by dot hatching are lighted.

FIG. 9 to FIG. 13 are views for describing an example of the lighting state of the tail lamp 6. FIG. 9 to FIG. 13 correspond to enlarged views when the tail lamp 6 is seen from the rear side.

Figure 9:
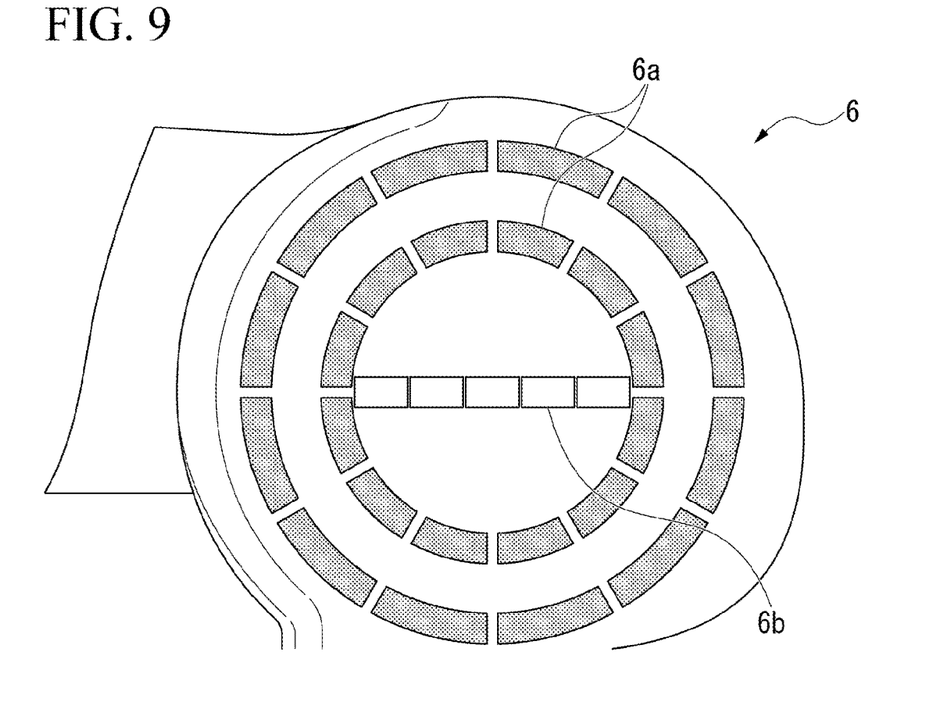
FIG. 9 is a view for describing an example of a lighting state of a tail lamp according to the embodiment of the present invention.

As shown in FIG. 9, for example, the tail lamps 6 can be used to indicate existence of the vehicle 100 to the following vehicle 102 at nighttime as the annular lights 6a are lighted. The tail lamps can also be used as direction indicators as the annular lights 6a are blinked.

Figure 10:
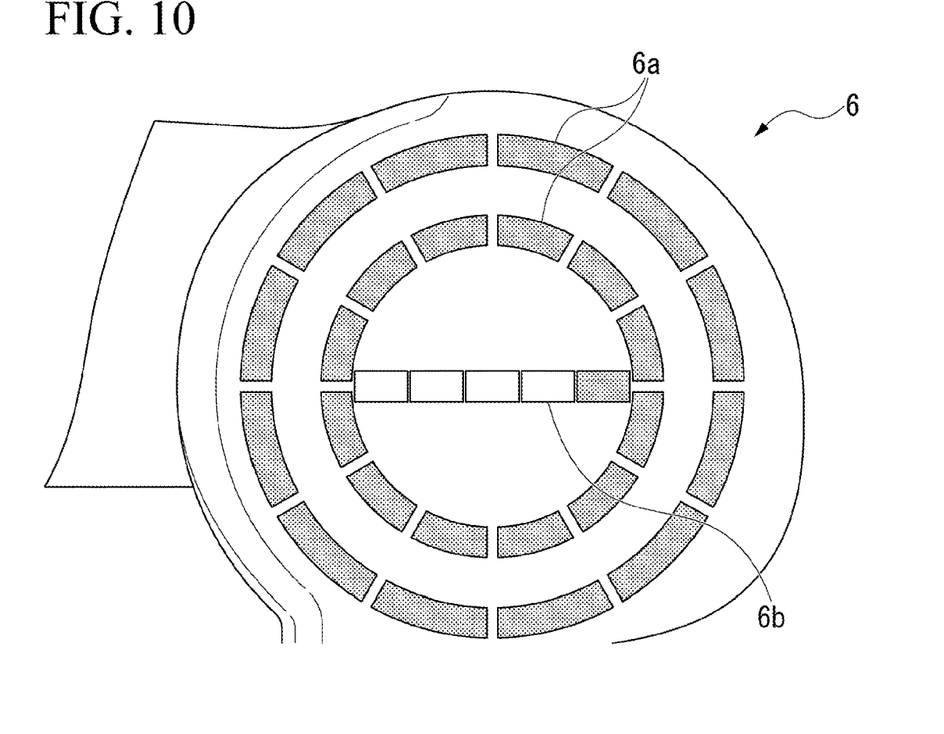
FIG. 10 is a view for describing an example of a lighting state of the tail lamp according to the embodiment of the present invention.
Figure 11:
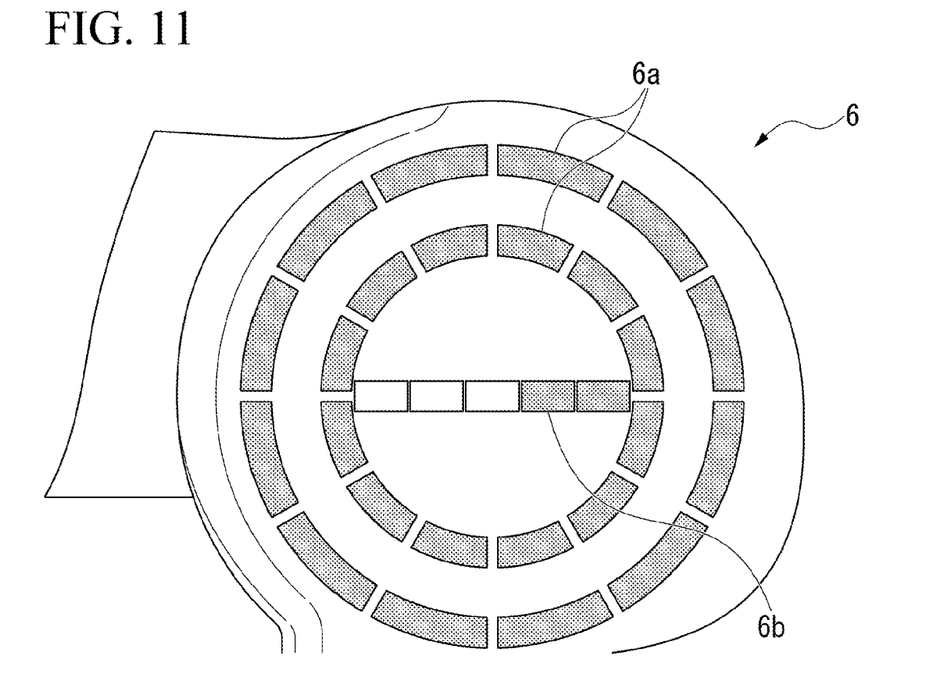
FIG. 11 is a view for describing an example of a lighting state of the tail lamp according to the embodiment of the present invention.
Figure 12:
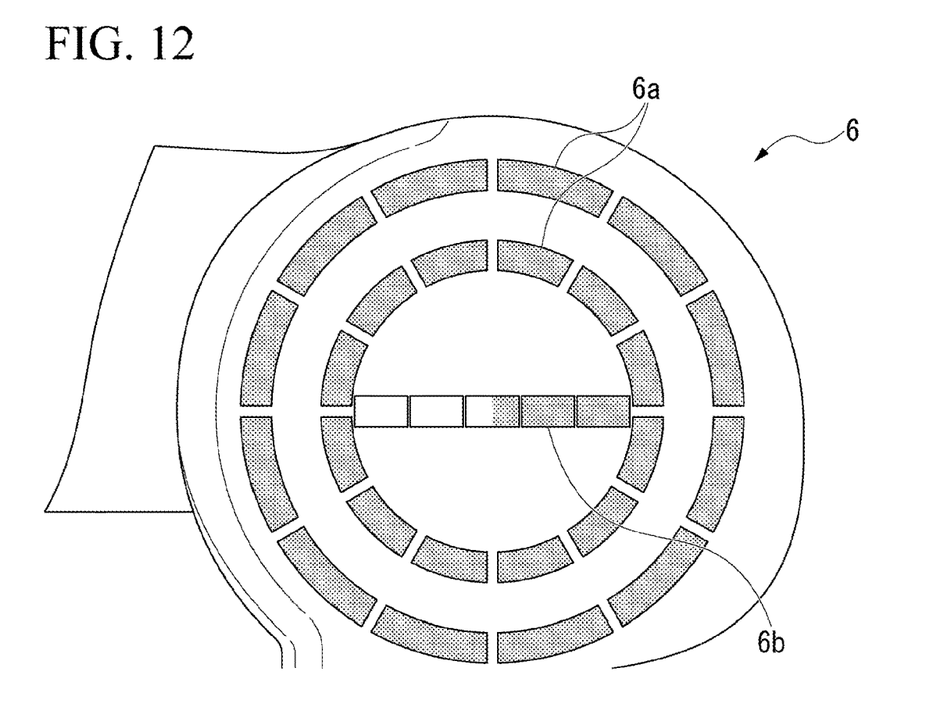
FIG. 12 is a view for describing an example of a lighting state of the tail lamp according to the embodiment of the present invention.
Figure 13:
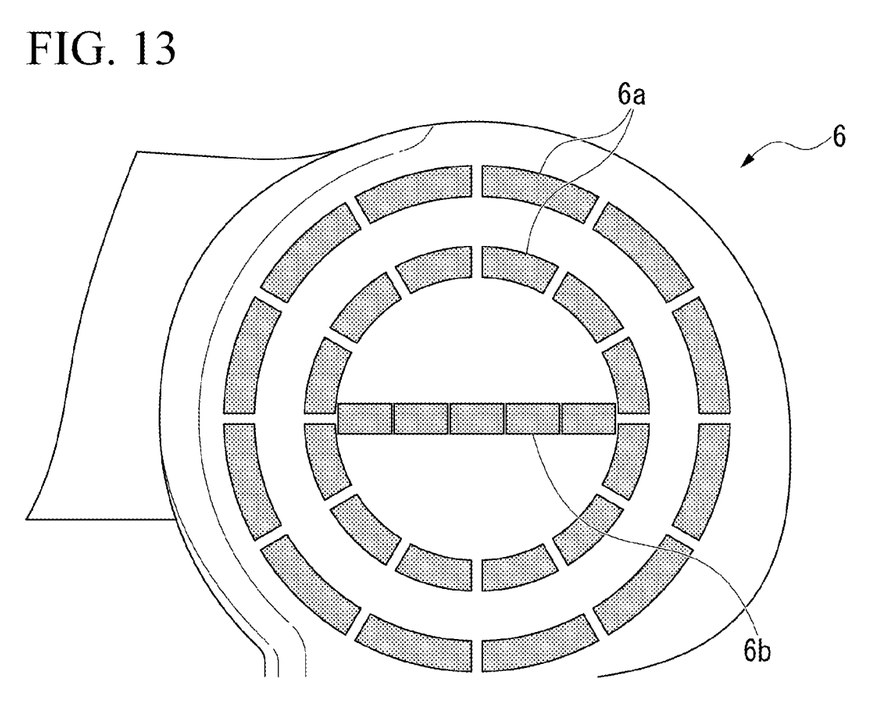
FIG. 13 is a view for describing an example of a lighting state of the tail lamp according to the embodiment of the present invention.

As shown in FIG. 10 to FIG. 12, for example, it can be set to the first lighting state or the second lighting state by lighting some of the plurality of horizontal lights 6b. Among the plurality of horizontal lights 6b, the lighting number in the case of the first lighting and the lighting number of the second lighting can be arbitrarily determined. As shown in FIG. 13, it is also possible to call attention to the following vehicle 102 by lighting all the horizontal lights 6b. When all the horizontal lights 6b are lighted, it may be the emergency second lighting. In addition, by continuously performing the lighting states shown in FIG. 10 to FIG. 13, it is also possible to animate and display the tail lamps 6.

In this way, the illumination device for a vehicle 1 includes the recognition part 2, the detection part 3, and the exterior lights 5. When the recognition part 2 recognizes that the following vehicle 102 is present on either the left or right side in the vehicle width direction and when the detection part 3 detects that the driver recognizes the following vehicle 102, the exterior lights 5 are in the first lighting state. On the other hand, when the recognition part 2 recognizes that the following vehicle 102 is present on either the left or right side in the vehicle width direction and when the detection part 3 detects that the driver does not recognize the following vehicle 102, the exterior lights 5 are in the second lighting state. For this reason, the following vehicle 102 can clearly understand whether the driver recognizes the following vehicle 102. Accordingly, it is safe for the following vehicles 102, further improves traffic safety, and contributes to development of a sustainable transportation system.

In the second lighting, when the vehicle 100 turns to the side where the following vehicle 102 is present, it is an emergency second lighting state. In addition, in the second lighting, when the vehicle 100 does not turn to the side where the following vehicle 102 is present, it is a normal second lighting state. For this reason, the following vehicle 102 can more accurately understand the behavior of the vehicle 100 in advance. Accordingly, the following vehicle 102 will feel even more secure.

The detection part 3 (the controller 4) uses the rear display device 7 to determine whether the driver recognizes the following vehicle 102. That is, it is assumed that the driver recognizes the existence of the following vehicle 102 when the detection part 3 detects the driver's line of sight is directed to the rear display device 7. For this reason, the detection part 3 can accurately detect that the driver has recognized the following vehicle 102.

Further, it is assumed that the detection part 3 detects that the driver has recognized the existence of the following vehicle 102 when the driver's state has changed after the driver's line of sight has been directed to the rear display device 7. For this reason, the detection part 3 can more accurately detect that the driver has recognized the following vehicle 102.

The present invention is not limited to the above-mentioned embodiment, and includes additions of various modifications to the above-mentioned embodiment without departing from the scope of the present invention.

For example, in the above-mentioned embodiment, the case has been described in which the following vehicle 102 can understand whether the driver recognizes the following vehicle 102 by setting the first lighting state or the second lighting state. However, there is no limitation thereto, and in the first lighting state or the second lighting state, the exterior lights 5 may be blinked at a predetermined cycle, and in this case, for example, the blinking cycle may be different between the first lighting state and the second lighting state. In addition, a first not-lit state or a second not-lit state may be used instead of the first lighting state or the second lighting state. The first not-lit state is, for example, a state in which the exterior lights 5 are in a full lighting state during a normal operation, and some or all of the exterior lights 5 are turned off under the above-mentioned first lighting conditions. In addition, the second not-lit state refers to a state in which some or all of the exterior lights 5 are turned out from the full lighting state. Here, the first not-lit state and the second not-lit state are different from each other.

In the above-mentioned embodiment, the case in which the following vehicle 102 can understand whether the driver recognizes the following vehicle 102 by providing the exterior lights 5 or the tail lamps 6 in the vehicle 100 and changing the lighting state of the exterior lights 5 or the tail lamps 6 has been described. However, there is no limitation thereto, and the first lit (first not-lit) state and the second lit (second not-lit) state may be displayed by either the exterior lights 5 or the tail lamps 6. The first lit (first not-lit) state and the second lit (second not-lit) state may be made different so that the following vehicle 102 can understand whether the driver recognizes the following vehicle 102. That is, in a broad sense, both the exterior lights 5 and the tail lamps 6 correspond to exterior lights in the claims.

In the above-mentioned embodiment, the case in which the exterior lights 5 of the vehicle 100 are disposed in the exterior region of the vehicle 100 from both ends of the rear panel 21 in the vehicle width direction to the rear wheel houses 23 via the rear pillars 22 has been described. In addition, the case in which the plurality of the exterior lights 5 are arranged in parallel to be located downward obliquely as they go forward has been described. However, there is no limitation thereto, and the exterior lights 5 may be provided in at least one of the rear position and the side positions of the vehicle width direction in the exterior region of the vehicle 100. Detailed positions of the exterior lights 5 can be arbitrarily determined.

The first lighting state or the second lighting state is not limited to the above-mentioned embodiment, and various display methods can be employed. A display method using animation or the like is also possible. The first lighting state and the second lighting state may be different from each other.

In the above-mentioned embodiment, the case in which the rear display device 7 is, for example, the monitor provided in the passenger compartment 101 has been described. However, there is no limitation thereto, and the rear display device 7 may be any device that can display the rear of the vehicle 100. For example, the rear display device 7 may be a door mirror or a room mirror.

In the above-mentioned embodiment, in determining whether the driver recognizes the following vehicle 102, first, the case in which determination of whether the driver visually recognizes the rear display device 7 is performed (step ST201 in FIG. 5) has been described. Next, when the driver visually recognizes the rear display device 7, determination of whether the driver's state is changed is performed (step ST202 in FIG. 5) has been described. However, there is no limitation thereto, and determination of whether the driver recognizes the following vehicle 102 may be only determination by step ST201. Even in this case, it is possible to determine whether the driver recognizes the following vehicle 102.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An illumination device for a vehicle comprising:
    a recognition part configured to recognize that a following vehicle present behind a vehicle is present on either a left or right side in a vehicle width direction;
    a detection part configured to detect that a driver of the vehicle has recognized the following vehicle; and
    a pair of left and right exterior lights provided at least at one of a rear position and side positions in a vehicle width direction among an exterior region of the vehicle,
    wherein, when the recognition part recognizes that the following vehicle is present on the one side and when the detection part detects that the driver recognizes the following vehicle, the exterior light of the pair of left and right exterior lights which is disposed on a side, to which the following vehicle has moved, is made to either a first lit or first not-lit state,
    when the recognition part recognizes that the following vehicle is present on the one side and when the detection part detects that the driver has not recognized the following vehicle, the exterior light of the pair of left and right exterior lights which is disposed on the side, to which a following vehicle has moved, is made to either a second lit or second not-lit state, and
    the first lighting state and the second lighting state are different from each other and the first not-lit state and the second not-lit state are different from each other.

2. The illumination device for a vehicle according to claim 1, wherein the second lighting state and the second not-lit state are changed when the vehicle turns to the one side.

3. The illumination device for a vehicle according to claim 1, wherein the vehicle includes a rear display device configured to display behind the vehicle, and
    the detection part detects that the driver has recognized presence of the following vehicle when a line of sight of the driver is directed to the rear display device.

4. The illumination device for a vehicle according to claim 3, wherein the detection part detects that the driver has recognized presence of the following vehicle when a state of the driver has changed after the line of sight of the driver has been directed to the rear display device.

* * * * *